Dec. 8, 1970   J. LEVISON   3,546,546
BRUSHLESS ELECTRIC MOTORS
Filed Nov. 13, 1967   2 Sheets-Sheet 1
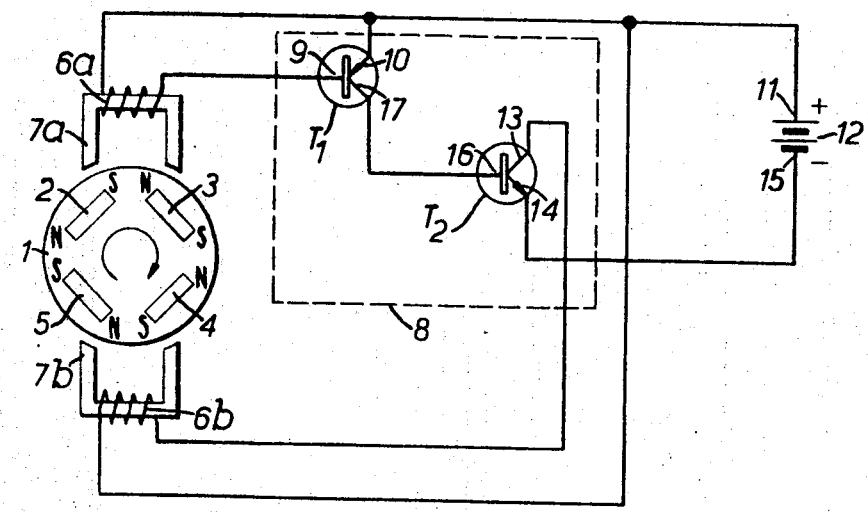
FIG./.
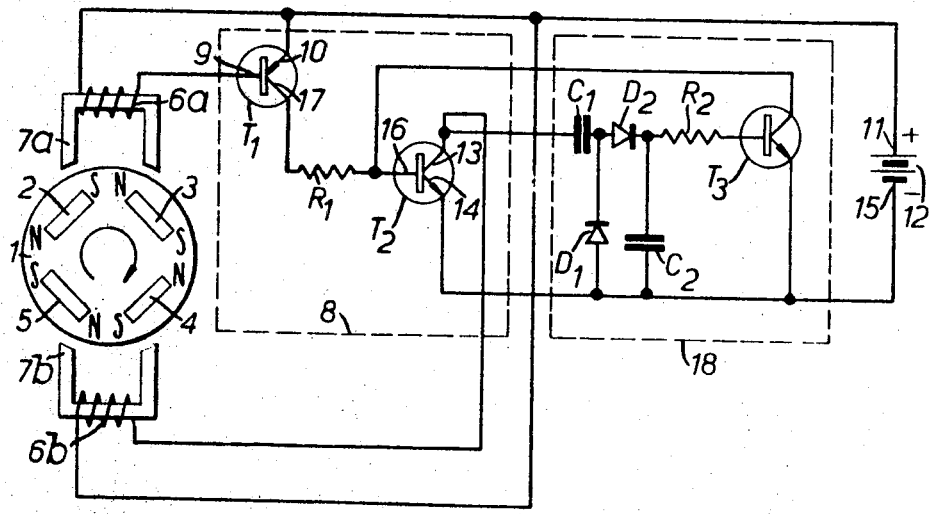
FIG.2.

3,546,546
BRUSHLESS ELECTRIC MOTORS
Jack Levison, Ilford, England, assignor to The Plessey
 Company Limited, Ilford, England, a British company
Filed Nov. 13, 1967, Ser. No. 681,999
Claims priority, application Great Britain, Nov. 11, 1966,
50,805/66
Int. Cl. H02k 29/00
U.S. Cl. 318—138                                     1 Claim

ABSTRACT OF THE DISCLOSURE

A brushless D.C. motor in which permanent magnetic poles on a rotor induce successive voltages into a first stator winding wound on a soft iron core in response to rotation of the rotor, the induced voltages being applied to a transistor switching and amplifier circuit the outputs of which are fed to a second stator winding wound on another soft iron core to produce a magnetic field which interacts with the permanent magnetic poles on the rotor to assist rotation of the rotor.

---

Figure 3:
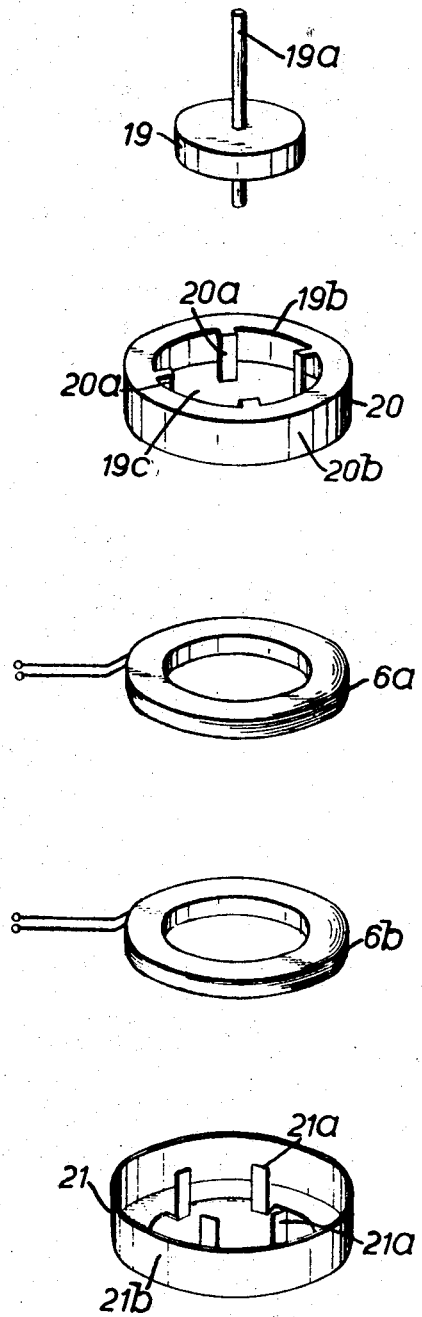

This invention relates to electric motors and relates more specifically to motors of the brushless type.

Hitherto, brushless electric motors have been provided with complex circuitry and to provide sufficient torque bulky rotors have been employed thus contributing towards inefficiency i.e. high input power for a known value of torque.

Furthermore, these electric motors when stalled draw large currents e.g. in the order of amps, which severely drain batteries and may destroy the associated circuitry and windings.

It is an object of this invention to provide a simple and efficient electric motor which is small, compact and produces the known value of torque for a much lower input power and rotor size and which when stalled does not draw current.

According to the present invention a brushless electric motor comprises a rotor having a number of magnetic pole, a stator, a first winding on the stator in which voltage pulses are induced responsively to rotation of the rotor with respect to the stator, a switch which is normally substantially non-conductive but which is rendered conductive in dependence upon said voltage pulses, a second winding on the stator, and a pair of terminals between which the switch and the second winding are connected in series so that an electric potential applied across the terminals produces a current in the second winding only if contemporaneous with one of the said voltage pulses.

An embodiment of the invention will now be described by way of example with reference to the accompanying drawings, in which FIG. 1 shows a circuit diagram of a brushless electric motor according to the invention;

FIG. 2 is a further circuit diagram of a brushless electric motor having additional circuitry which provides speed control of the motor; and FIG. 3 is an exploded view of the parts of a rotor and stator assembly according to the invention.

In FIG. 1 a conventional arrangement of stator and rotor are shown in which the rotor 1 is preferably of barium ferrite material permanently magnetised effectively to produce four magnets 2, 3, 4 and 5, the north-south poles of which are arranged as shown in the figure. Stator coils 6a and 6b are wound on two independent U-shaped soft iron cores 7a and 7b. These coils 6a and 6b are connected to the amplifier circuit 8, coil 6a being connected between base 9 and emitter 10 of transistor $T_1$, whilst one side of the coil 6b is connected to the emitter 10 of transistor $T_1$ and the positive terminal 11 of battery 12, the other side of the coil 6b being connected to the collector 13 of transistor $T_2$. The emitter 14 of transistor $T_2$ is connected to negative terminal 15 of the battery 12, and base 16 is directly coupled to collector 17 of transistor $T_1$.

In the operation of the device it is necessary to apply a mechanical force to the rotor 1, for example in the direction of the arrow shown in FIG. 1, thereby causing the south pole of magnet 2 to approach the soft iron core 7a. This action induces a changing magnetic field in the soft iron core 7a and thus an E.M.F. in the stator coil 6a, which is wound so that the E.M.F. causes the base 9 of transistor $T_1$ to go negative, thereby causing the transistor $T_1$ to conduct. The voltage on the collector 17 of transistor $T_1$ and the base 16 of transistor $T_2$ therefore goes positive, attaining a value nearly equal to the voltage of the positive terminal 11 of the battery 12, which causes the transistor $T_2$ which is complementary to transistor $T_1$ to conduct. The transistor $T_1$ and $T_2$ amplify the initial current and pass it through the stator coil 6b, in the collector circuit of transistor $T_2$, which in turn induces a magnetic field into the soft iron core 7b. The stronger magnetic field in the soft iron core 7b reacts with the north pole of magnet 5 and the south pole of magnet 4 to produce movement in the direction indicated in order to sustain rotation of the rotor 1.

The angular momentum of the rotor 1, due to the magnetic field produced in the core 7b has two effects. The first effect is to cause the north pole of the magnet 2 to come close to the soft iron core 7a, thereby inducing an E.M.F. in the coil 6a in the opposite phase to that developed by the south pole of the magnet 2, and this E.M.F. causes the transistors $T_1$ and $T_2$ to be stop conducting and the core 7b to become demagnetised. The second effect of the angular momentum is to cause the south pole of the magnet 5 to be carried on towards the core 7a even though no current is flowing in the transistor circuit and this approach of the south pole of the magnet 5 starts the rotor driving cycle off again thereby providing a smooth running electric motor.

It is an important feature of the electric motor according to this invention that when the rotor 1 is stalled no current is drawn from the battery 12. This may be readily appreciated from the above description since when the rotor stops, no E.M.F. will be generated in the coil 6a and therefore the transistors $T_1$ and $T_2$ will be rendered non-conductive. The only current drawn in this static state will be due to the leakage currents of the transistors $T_1$ and $T_2$ and these are of the order of micro-amps and may therefore be neglected.

It may also be readily appreciated that the motor is reversible and the hereinbefore described operation of the electric motor will apply in precisely the same manner simply be imparting counter-clockwise initial movement to the rotor 1.

In FIG. 2 is shown the circuit arrangement of an electric motor according to the present invention having a conventional "diode pump" circuit 18 for controlling the speed of the rotor 1. This "diode pump" circuit relies on the positive pulses occurring each time transistor $T_2$ is switched off, which charge up the capacitor $C_2$. As the voltage on capacitor $C_2$ rises positively to a predetermined level the transistor $T_3$ becomes conductive and provides a low resistance path from the base 16 of transistor $T_2$ to the negative terminal 15 of the battery 12. The action serves to reduce the current in the coil 6b thereby reducing the induced magnetic field in the core 7b and consequently the speed of the rotor 1. As the collector 13 of transistor $T_2$ goes negative upon conduction of the transistor $T_2$ the voltage on capacitor $C_2$ discharges through resistor $R_2$ and the base emitter circuit of transistor $T_3$ thereby rendering transistor $T_3$ non-conductive when the charge falls to a certain level. The transistor $T_3$ now acts as a high impedance between the base 16 of transistor $T_2$ and terminal 15 of the battery 12, thereby allowing the current in the coil 6b to increase with a consequential increase in the speed of the rotor.

A practical form of rotor and stator assembly is shown in FIG. 3 in which there is a rotor 19 having a spindle 19a and a stator assembly which comprises two cup-shaped soft iron cores 20 and 21 having intermeshing lugs 20a and 21a respectively which project parallel to the skirts 20b and 21b from the periphery 19b of the rotor recess 19c. The stator coils 6a and 6b are wound individually on a former (not shown) which sits between the intermeshing lugs 20a and 21a and the skirts 20b and 21b respectively.

The shallow cylindrical rotor 19, preferably of barium ferrite material, is accommodated in the rotor recess 19c with its external periphery suitably spaced from the lugs 20a and 21a.

These embodiments have been given by way of example only and various modifications may be made without departing from the scope of the invention. For instance, the rotor may be of any suitable permanently magnetisable material and may be magnetised to effect any number of pairs of poles around its periphery. Furthermore, the stator windings 6a and 6b may be a single winding which is suitably tapped, also the lugs 20a and 21a may comprise any number of lugs.

A further modification may comprise a separate winding through which a current is passed for the sole purpose of producing initial movement of the rotor during starting of the motor, or as another example, of a starting arrangement, a capacitor may be arranged to discharge through one of the existing stator windings thereby inducing a magnetic field into the respective soft iron core which will in turn initiate angular movement of the rotor.

For a given torque conventional motors may be replaced by smaller, more compact and more efficient D.C. brushless motors according to the invention which when stalled will not draw current therefore giving longer battery life and protecting the associated windings from excessive stall curernts.

Due to the inherent qualities of motors according to the invention they may be conveniently employed efficiently to drive toy vehicles, miniature tape recorders, motor car windscreen wipers, etc., and because of its simplicity the circuit may be conveniently manufactured in integrated circuit form.

What we claim is:

1. A brushless electric motor comprising a rotor having a number of magnetic poles, a stator, a first winding on the stator in which voltage pulses are induced responsively to rotation of the rotor of the rotor with respect to the stator, a switch, normally substantially non-conductive but which is rendered conductive in dependence upon said voltage pulses, a second winding on the stator, and a pair of terminals between which the switch and the second winding are connected in series so that an electric potential applied across the terminals produces a current in the second winding only if contemperaneous with one of the said voltage pulses, an amplifier via which the said voltage pulses are applied to the said switch, the said switch and the said amplifier comprising respective transistors of a complementary pair, and a speed control arrangement comprising a diode pump circuit operatively associated with that one of the said transistors which forms the said switch for controlling its conductivity in accordance with the frequency of the said voltage pulses.

References Cited

UNITED STATES PATENTS

| | | | |
|---|---|---|---|
| 2,895,095 | 7/1959 | Guyton | 318—138X |
| 2,986,684 | 5/1961 | Gluwen | 318—138 |
| 3,174,088 | 3/1965 | Müller | 318—138 |
| 3,200,315 | 8/1965 | Thompson | 318—138 |
| 3,209,224 | 9/1965 | Guinard | 318—138 |
| 3,284,687 | 11/1966 | Schlenker | 318—138 |
| 3,305,713 | 2/1967 | Ikegami | 318—138 |
| 3,339,133 | 8/1967 | Favre | 318—138 |

ORIS L. RADER, Primary Examiner

G. Z. RUBINSON, Assistant Examiner

U.S. Cl. X.R.

318—254